United States Patent [19]

Faber

[11] 4,108,567
[45] Aug. 22, 1978

[54] BORING TOOL

[75] Inventor: Kurt Heinrich Albert Erich Faber, Sandviken, Sweden

[73] Assignee: Sandvik Aktiebolag, Sandviken, Sweden

[21] Appl. No.: 826,656

[22] Filed: Aug. 22, 1977

Related U.S. Application Data

[63] Continuation of Ser. No. 648,016, Jan. 12, 1976, abandoned.

[30] Foreign Application Priority Data

Jan. 20, 1975 [SE] Sweden ................ 7500542

[51] Int. Cl.² ................ B23B 51/00; B23B 41/02
[52] U.S. Cl. .................... 408/224; 408/206; 408/226
[58] Field of Search ............. 408/200, 204, 206, 211, 408/223, 224, 226, 227, 228, 231, 233, 705, 713; 175/398, 399, 403, 408, 410, 413

[56] References Cited

U.S. PATENT DOCUMENTS

| 2,869,405 | 1/1959 | Wolfe | 408/233 |
| 3,244,035 | 4/1966 | Jehle et al. | 408/204 |
| 3,376,763 | 4/1968 | Welles | 408/713 |
| 3,548,687 | 12/1970 | Holloway | 408/206 |
| 3,751,177 | 8/1973 | Faber | 408/226 |
| 3,816,018 | 6/1974 | Hlocky | 408/226 |

Primary Examiner—Harrison L. Hinson
Attorney, Agent, or Firm—Burns, Doane, Swecker & Mathis

[57] ABSTRACT

The drill of the invention comprises a drill head having at least one guide pad, at least one outer cutting insert located at the periphery of the drill head surface and at least one inner cutting insert, having an active cutting edge, located nearer to the center of the drill head surface. The active cutting edge of the inner insert is situated within the outer edge of the guide pad or pads. Preferably, a plurality of cutting inserts are so arranged on the drill head that the resulting cutting force at all engaged inserts is on a level with the outer end of the guide pads.

2 Claims, 5 Drawing Figures

DIRECTION OF BORING

BORING TOOL

This is a continuation, of application Ser. No. 648,016 filed Jan. 12, 1976 now abandoned.

The present invention relates to a boring tool — such for example as a drill for drilling in metal — of the type having the cutting edge divided upon several cutting inserts overlapping each other. The cutting inserts usually consist of cemented carbide or similar material and can be brazed to the drill head of the boring tool, while in other cases they can be applied in the form of indexable inserts mounted in tool holders. The holders can in their turn be exchangeably attached to the drill head. Drills having indexable cutting inserts are preferably used for forming bores at large diameters. In this kind of boring tool the cutting inserts usually are placed on each side of the center line of the drill, thus balancing the cutting forces. In this way it has also been attempted to decrease the pressure upon the guide pads normally arranged in the front part of the drill in order to support and guide the drill along the bore hole.

In drill constructions heretofore known there have been observed some serious drawbacks, stemming from an insufficient balancing of the cutting forces in spite of the mentioned disposal of the cutting inserts. Thus, optimum operating or cutting conditions have not been obtained. It has been observed that the guide pads of the boring tools used so far were often seriously worn. A similar wear was also found in the drill bushing used for guiding the drill at the start, or for setting the drilling and for supplying cooling medium into the chip canals of the drill. Besides the mentioned wear, there has been observed an incorrect setting of the drill, leading to an unsatisfactory quality of the bore hole.

According to the present invention there is now available a boring tool having a modified placing of the cutting inserts, by which the mentioned problems or disadvantages have been eliminated. Contrary to eariler boring tools, in which the active cutting edges — quite conventionally give the front end of the drill an essentially pointed or protruding contour, the cutting inserts of the tool according to the invention are so disposed that the cutting edges — except for the outer cutting insert determining the dimension of the bore hole — normally form an essentially blunt-ended or inward-turned outline. By placing the cutting inserts in this manner there has been obtained a decrease load upon the guide pads and the corresponding elements, mainly because of the fact that an arising bending moment over the outer corners of the guide pads has been decreased or completely eliminated.

Being a general statement, the main cutting force or essentially the tangentially directed force during the drilling operation is the resultant of the corresponding forces acting upon the separate cutting inserts. By placing the inserts on both sides of the center line, there is obtained a reduction of the total main cutting force or resultant force, this being a previously used technique per se, i.e. the earlier indicated "balancing". In a conventional drill, in which the cutting inserts or their active cutting edges are essentially disposed outside the guide pads — seen in the drilling direction — the resultant force will, however, be situated outside the guide pads. This creates a bending movement, which causes the earlier mentioned disadvantages, as the resulting cutting forces — in spite of "balancing" — can be considerable.

In the tool according to the invention — on the other hand — the cutting inserts preferably are so disposed that the resulting cutting force is situated within the supporting surface of the guide pads, the bending moment over the outer corners of the pads thus being eliminated.

The invention will now be described in greater particularity in the following description taken in connection with the attached drawings, in which.

Figure 1:
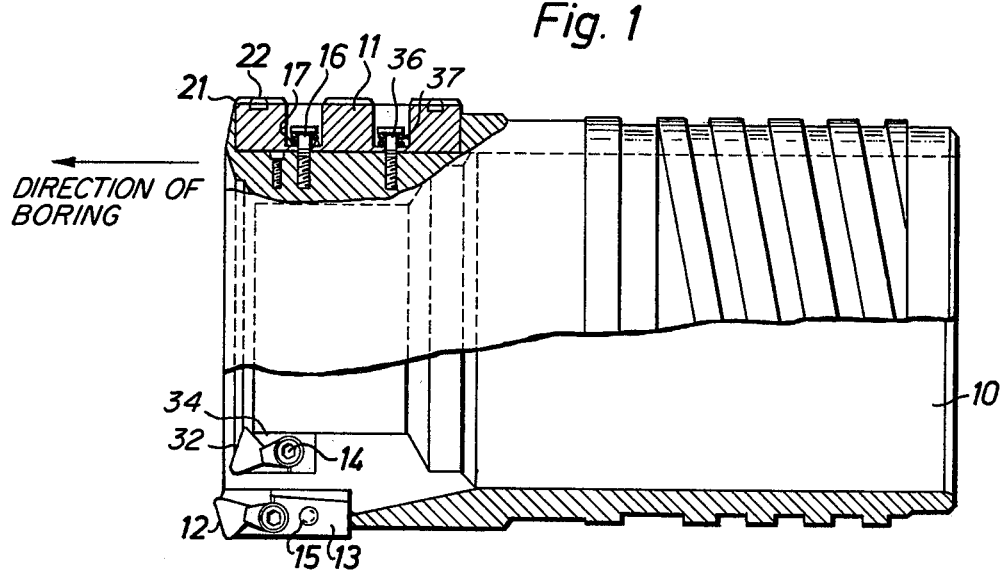
FIG. 1 is a side view of cutting tool according to the invention.
Figure 2:
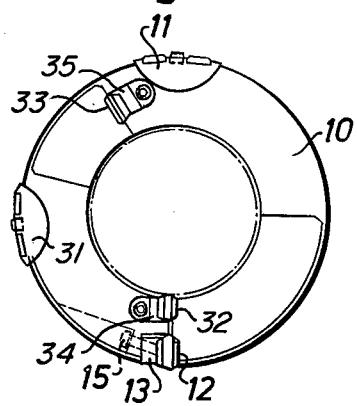
FIG. 2 is an end view of the tool according to FIG. 1.
Figure 3:
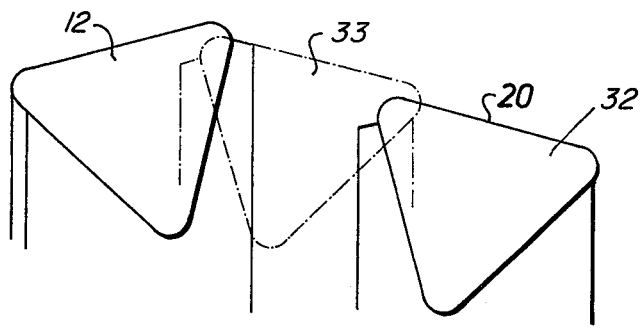
FIG. 3 is an enlarged view showing the distribution of the cutting inserts in the tool according to FIGS. 1 and 2.

The tool shown in FIGS. 1-3 consists of a drill comprising a drill head 10 with guide pads 11, 31 and cutting inserts 12, 32, 33. The cutting inserts being indexable plates — are clamped in insert holders 13, 34, 35 by means of clamps 14. The cutting inserts are placed on both sides of the center line or longitudinal axis 9 of the drill, thus shearing a number of zones separated from each other. By a suitable distribution or overlapping of the cutting inserts a whole continuous surface is cut (compare FIG. 3). This may be annular (as in "core drilling" according to FIGS. 1-3) but the invention is applicable also to widening of an already existing bore hole ("reaming") and is of great importance in shearing the whole surface in front of the drill ("full-boring" according to FIGS. 4-5).

The insert holder 13, 34, 35 which can be of somewhat different kind depending upon its function as center, peripheral or "intermediate" cutter support, is attached to the drill head by means of a screw 15. The guide pad which is pivotally supported, or can adjust itself in a known way, is mounted in the drill head by means of screws 16, 36 and a helical springs 17, 37.

Figure 4:
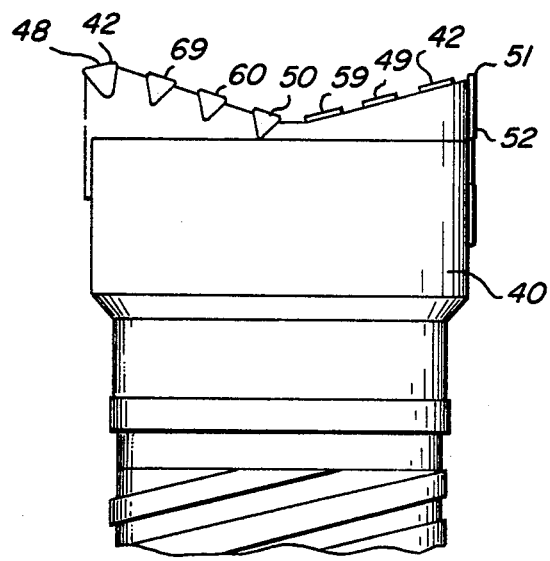
FIGS. 4 and 5 show another embodiment of the tool according to the invention.

The cutting insert distribution, or improved insert geometry, which is characteristic of the tool according to the invention may particularly be observed in FIGS. 3 and 4. While the outer cutting insert 12, 48 — determining the dimesion of the bore hole and situated at the periphery of the drill — has a completely conventional position and setting in the drill body, the inner cutting inserts 32, 33, 49, 59, 69, 50, 60 have been given a drawn-in or inward-turned placement in contrast to commom drill constructions. In the cutting tool according to the invention the active cutting edges of the overlapping inner cutting inserts often exhibit an essentially rectilinear, inwardly pointing contour. At least one of the inner cutting inserts, which in the first shown embodiment (FIGS. 1-3) is the insert situated next to the center of the drill, is so arranged that its active cutting edge 20 is situated within the outer edge or limitation 21 of the guide pad, seen in the direction of the working or drilling.

From FIG. 3 it can be calculated that in the first embodiment (according to FIGS. 1-3) only the cutting force which is the resultant of the cutting forces acting upon the separate outer inserts 12, 32 will be in engagement when the guide pads enter the bore hole. Because the resultant force in this case is essentially the difference between the cutting forces acting upon the two mentioned inserts (being disposed on each side of the center line) and thus is of moderate magnitude, the wear of guide pads and drill bushing will be reduced. The "drawn-in" placement of the cutting inserts also means that the mentioned resultant force obtains a relatively short moment arm outside the guide pad, i.e. in relation to the outer edge 21 of the guide pads. Because the cutting forces as well as the moment arm thus have been decreased in comparison with the conditions in conventional insert geometry of the drill, the bending moment is minimized and the risks of incorrect setting of the drill are considerably reduced.

When the whole drill is brought into operation or engagement, the resulting cutting force of all inserts is at least on a level with the outer limitations or end 21 of the guide pads and preferably within the supporting face 22 of the guide pads, the bending moment over the outer corners of the guide pads being completely or substantially eliminated.

The improved insert geometry which has been discussed can preferably be used in tools for making large and long bore holes. It is realized that particularly in those cases where a large bore surface shall be sheared by means of a plurality of inserts overlapping each other, great improvements can be reached by strictly applying the principles inherent in the invention.

Figure 5:
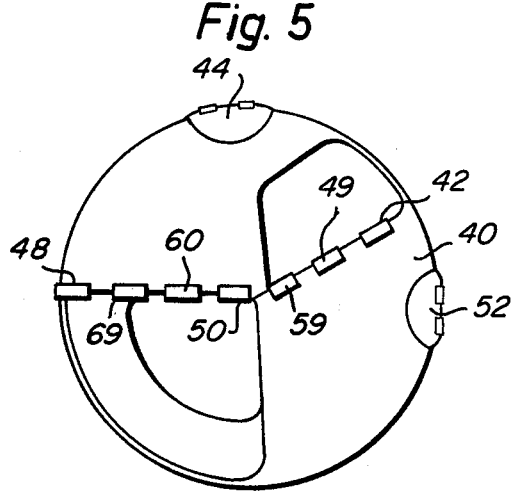

In FIGS. 4 and 5 there is shown a modified form in which the drill head 40 is provided with the guide pads 41, 52 and cutting inserts 42, 49, 59, 60, 69, 48, 50. The cutting inserts, being indexable plates, are clamped in insert holders by means of clamps (not shown). The cutting inserts are placed on both sides of the center line of the drill, shearing the whole surface in front of the drill. All the inner cutting inserts 49, 59, 50, 60, 69 are so arranged that their active cutting edges are situated axially behind the leading edge 51 of the leading guide pad 52 in the direction of boring. Furthermore, the inner cutting inserts are so arranged that their active cutting edges form an essential rectilinear, inwardly pointing contour.

I claim:

1. A boring tool, for making or enlarging a hole in metal, of the kind having the cutting action divided between several cutting inserts whose paths overlap with each other, the boring tool comprising:
   a head portion comprising a body having a periphery, a longitudinal axis, a working end, a shank end situated longitudinally opposite said working end, said working end including a working face, a guide pad disposed on said periphery adjacent said working end for engaging a side of a bore being formed, said guide pad including a leading end directed toward said working face;
   an outer insert including a cutting edge and located at said periphery with said cutting edge projecting from said working face;
   an inner insert including a cutting edge and located at the end face between said longitudinal axis and said outer insert,
      said leading end of said guide pad axially leads said cutting edge of said inner insert toward said working end.

2. A boring tool, for making or enlarging a hole in metal, of the kind having the cutting action divided between several cutting inserts whose paths overlap with each other, the boring tool comprising:
   a head portion comprising a body having a periphery, a longitudinal axis, a working end, a shank end situated longitudinally opposite said working end, said working end including a working face, a guide pad disposed on said periphery adjacent said working end for engaging a side of a bore being formed, said guide pad including a leading end directed toward said working face;
   an outer insert including a cutting edge and located at said periphery with said cutting edge projecting from said working face;
   an inner insert including a cutting edge and located at the end face between said longitudinal axis and said outer insert;
      said leading end of said guide pad axially leads said cutting edge of said inner insert toward said working end, and
      said cutting edges of said outer and inner inserts being oriented at an oblique angle relative to said axis.

* * * * *